July 25, 1933. W. HESSLING 1,919,698
APPARATUS FOR THE AGGLOMERATION OF SOLID CARBON DIOXIDE
Filed July 21, 1928
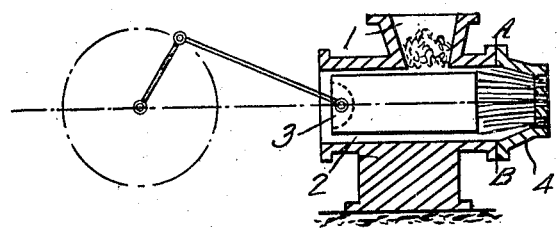

Patented July 25, 1933

1,919,698

UNITED STATES PATENT OFFICE

WALDEMAR HESSLING, OF GENEVA, SWITZERLAND, ASSIGNOR TO ELVIRE HESSLING-DE WERNER, OF VEYTAUX-TERRITET, SWITZERLAND

APPARATUS FOR THE AGGLOMERATION OF SOLID CARBON DIOXIDE

Application filed July 21, 1928, Serial No. 294,520, and in Switzerland July 27, 1927.

Solid carbon dioxide is generally obtained in the form of snow by expanding compressed liquid carbon dioxide. The drawback of this snow is that it is very bulky. In order to reduce its volume, it is generally compressed in forms by hydraulic or similar presses. If an adequate output at each compression operation is to be obtained the forms must be of comparatively large size. There are many uses of solid carbon dioxide calling for pieces of comparatively small size. The blocks compressed in the usual presses are subsequently cut up into smaller pieces by saws. This method of obtaining comparatively small pieces of solid carbon dioxide requires a great deal of handling, and causes fairly considerable losses by evaporation during the handling. The same disadvantages will prevail if the solid carbon dioxide is originally in the form of broken pieces of carbon dioxide ice, instead of carbon dioxide snow, the ice being obtained, for instance, by a freezing process.

The object of the present invention is an apparatus for the agglomeration of solid carbon dioxide, which will avoid the above mentioned disadvantages by producing comparatively small pieces of agglomerated solid carbon dioxide fully automatically and without evaporation losses, the pieces being of the size, and having the shape most suitable for many uses.

It is known that carbon dioxide snow is converted into ice by a sort of recrystallization at a pressure of about 80 to 120 atmospheres. I have discovered that if the pressure is further increased, the carbon dioxide ice becomes plastic at a pressure of about 200 atmospheres, and can be squeezed out through small orifices. In my press the snow is tamped, fully or partially recrystallized, and fully or partially subjected to a plastic deformation. If instead of carbon dioxide snow carbon dioxide ice is fed into the press it is fully or partially recrystallized, and fully or partially subjected to a plastic deformation. In the following I understand by "solid carbon dioxide" either carbon dioxide "snow" or carbon dioxide "ice".

The accompanying drawing given by way of example shows a construction of the apparatus. The figure is a diagrammatic section of a press with horizontal axis.

In the construction shown in the figure, solid carbon dioxide is fed into the hopper 1 of the press. The latter comprises a cylinder 2 mounted on a frame or bed, in the bore of which a piston 3 reciprocates, being driven by a connecting rod and crank. The open end of the cylinder is provided with a duct 4 concentric with the cylinder, and taking the shape of a nozzle, the end cover of which is provided with two or preferably several orifices intended to discharge the solid agglomerated carbon dioxide in the form of rods, which, when broken, are very suitable for many purposes. The sum of the cross-sections of the orifices is smaller than the cross-section of the end of the duct immediately preceding the orifices. This narrowing of the passage has for its object to produce the back-pressure required for the agglomeration of the solid carbon dioxide. Such a narrowing of the passage is feasible, because solid carbon dioxide can be deformed plastically by lateral pressure; it does not break up into pieces, like a brittle material would in such a duct. It is of advantage to drive the piston by a crank-shaft, because a piston driven in this manner will deliver at the end of its stroke whatever pressure is necessary for the discharge of the solid carbon dioxide, and not more, whereas with a piston driven by other means, such as, for instance, a hydraulic press, the force is limited by the power of the press, and power wasted, if the required pressure for agglomerating the solid carbon dioxide is smaller than the power available in the hydraulic press. The hopper can be funnel-shaped, or cylindrical, or prismatic.

What I claim and desire to secure by Letters Patent of the United States is:—

Apparatus for the agglomeration of solid carbon dioxide comprising, in combination, a hopper for receiving same, a compression chamber beneath the hopper to receive the solid carbon dioxide gravitating from the latter, a piston in said chamber for compressing said solid carbon dioxide into agglomerated form, a crank shaft to drive said piston, an open discharge duct extending from said compression chamber, and a nozzle on one end of said duct provided with a plurality of openings.

WALDEMAR HESSLING.